(12) United States Patent
Yoshida et al.

(10) Patent No.: US 6,448,792 B1
(45) Date of Patent: Sep. 10, 2002

(54) SENSOR FOR EDGE POSITION OF ELECTRO-CONDUCTIVE MATERIAL

(75) Inventors: Hirokazu Yoshida, Misato; Akira Shimotori, Hachioji, both of (JP)

(73) Assignee: Nireco Corporation, Tokyo (JP)

( * ) Notice: Subject to any disclaimer, the term of this patent is extended or adjusted under 35 U.S.C. 154(b) by 84 days.

(21) Appl. No.: 09/580,969

(22) Filed: May 30, 2000

(30) Foreign Application Priority Data

Jun. 8, 1999 (JP) .......................................... 11-161631
Jun. 11, 1999 (JP) .......................................... 11-164761

(51) Int. Cl.⁷ .......................... G01R 27/26; G01R 27/28
(52) U.S. Cl. ...................... 324/674; 324/661; 324/662; 324/663; 324/660; 324/679; 324/681
(58) Field of Search ................................ 324/674, 663, 324/688, 660, 679, 662, 661, 681

(56) References Cited

U.S. PATENT DOCUMENTS

| | | | | | |
|---|---|---|---|---|---|
| 3,312,892 A | * | 4/1967 | Parnes | ........................ | 324/660 |
| 3,341,774 A | * | 9/1967 | Dyben | ........................ | 324/663 |
| 3,812,424 A | * | 5/1974 | Abbe | ........................ | 324/688 |
| 4,322,678 A | * | 3/1982 | Capots et al. | ................ | 324/663 |
| 4,719,409 A | * | 1/1988 | Dorman | ........................ | 324/681 |
| 4,837,500 A | * | 6/1989 | Abbringh | ...................... | 324/660 |
| 4,893,071 A | * | 1/1990 | Miller | ......................... | 324/660 |
| 4,922,181 A | * | 5/1990 | Pullan | ......................... | 324/664 |
| 5,134,379 A | * | 7/1992 | Maher et al. | ................ | 324/663 |
| 5,394,095 A | * | 2/1995 | Kespohl | ...................... | 324/674 |

* cited by examiner

*Primary Examiner*—N. Le
*Assistant Examiner*—Wasseem H. Hamdan
(74) *Attorney, Agent, or Firm*—McDermott, Will & Emery

(57) ABSTRACT

The edge portion of an electro-conductive material inserted between a pair of the transmitting electrodes of triangular plate disposed flatly in opposite directions each other and the receiving electrode. The exciting signal source applies respectively the alternating voltage signal $S_1$ with frequency $f_1$ on one of the transmitting electrodes and the alternating voltage signal $S_2$ with frequency $f_2$ on the other transmitting electrode. The insertion extent of the strip edge of the electro-conductive material is evaluated with the ratio between the current $I_1$ with frequency $f_1$ and the current $I_2$ with frequency $f_2$ generated on the receiving electrode.

4 Claims, 7 Drawing Sheets

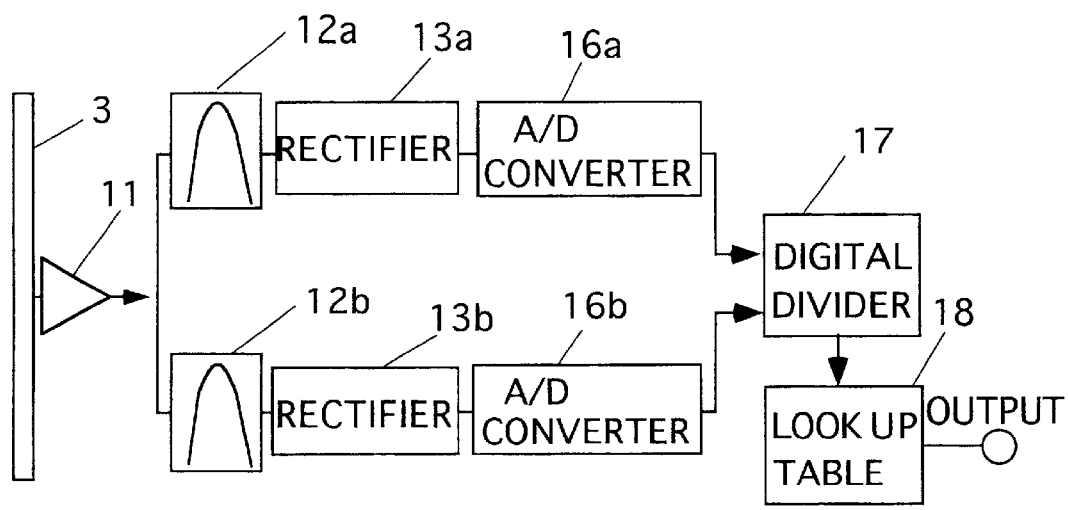
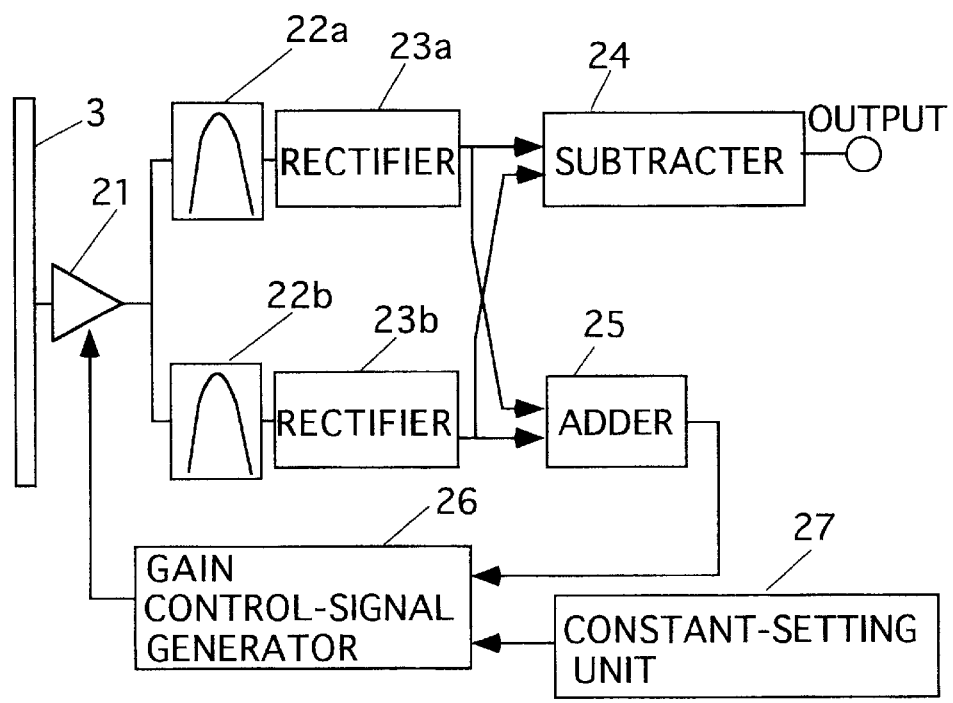

SENSOR FOR EDGE POSITION OF ELECTRO-CONDUCTIVE MATERIAL

BACKGROUND OF THE INVENTION

1. Field of the Invention

This invention relates to a sensor for detection of the extent of strip edge of mostly metallic electro-conductive materials inserted between the electrodes comprising the detector.

2. Description of the Prior Art

Various methods have been devised and utilized to sense the edge position of a strip of electro-conductive material, including such means as photoelectric, image-processing, or electromagnetic methods. These methods have been employed accordingly for specific purposes with their advantages and short-comings taken into consideration.

In addition to these methods, a method in practice is the means for detection of the change in capacitance or its mediated variables. In principle, the method in use of capacitance further has two variations. The first method utilizes the change in capacitance itself, as shown in FIG. 1. The high-frequency voltage source 101 is applied between the electro-conductive strip 100 and the electrode 102, so that the insertion extent X of the strip 100 into the electrode 102 gives rise to the change in capacitance which is detected as the change in resonant frequency associated with the tuning coil 104. The change in the resonant current thereof is amplified by the amplifier 103 to evaluate the insertion extent X.

In the second method the evaluation of the extent is performed through a signal mediated by means of capacitance such as the change in high-frequency voltage with insertion of an electro-conductive material into a capacitor. FIG. 2 illustrates an exemplary embodiment of this method. The high-frequency voltage source 101 is applied on the transmitting electrode 102a, so that the current change responding to the portion X of the electro-conductive strip 100 inserted between the transmitting electrode 102a and the receiving electrode 102b is amplified by the amplifier 103 to detect the insertion extent X.

The device of the second method has an input terminal and an output terminal, between which a function is defined so that the output of the function varies with the inserted position of the electro-conductive strip. The function is simply expressed as $$Y = K \cdot X \tag{1}$$

where Y is the output such as voltage and K is a coefficient X denotes the insertion extent of the strip between the electrodes.

The present invention described in the followings is associated with the type of the second method, which is hereafter called "electrostatic three-terminal model." The exciting signal source commonly used for the system of electrostatic three-terminal model is the high-frequency voltage, which the present invention also utilizes. This selection, however, arises simply from a practical feasibility, and the present invention may be theoretically realized employing an alternating voltage with any frequency above 0.

As Equation (1) above indicates, the function is desired to be sensitive only to X, the insertion extent of the strip between the electrodes. In the actual operation, however, several factors cause some fluctuation in the coefficient. The following Equation (2) is obtained by adjusting Equation (1) closer to the reality:

$$Y = (1+\alpha) \cdot K \cdot X \tag{2}$$

where α represents the fluctuation of the coefficient due to, for example, complex change in space dielectric constant owing to temperature, humidity or pressure in atmosphere, variation in the distance between the transmitting and receiving electrodes, or electric reflection and/or leakage in the surroundings. Notwithstanding these effects, Equation (2) has yet been used assuming that the variation in α is negligible or very small. This situation naturally imposes a serious restriction on practical use, limiting the applicable range and facility.

SUMMARY OF THE INVENTION

It is accordingly an object of this invention to overcome the difficulties described above and to provide a sensing device for detection of the insertion extent of electro-conductive strip between the electrodes isolated from the surrounding physical conditions.

The essential concept in this invention is based on the assumption that the fluctuation of a in Equation (2), that is, interference by the various factors, spreads uniformly in the physical space occupied With the detector. For explanation of the solution to the difficulties, the basic principle common to the electrostatic three-terminal model is described at first with reference to FIG. 3. An electro-conductive strip 1 is inserted by x between the transmitting electrode 2 and the receiving electrode 3 disposed facing to the electrode 2. The high-frequency voltage source 4 supplies the alternating voltage to the transmitting electrode 2 to form the electric flux between the electrodes 2 and 3. The first approximation only is considered here, so that the fringe effect of capacitance and the curvature of electric flux are neglected for simplicity of explanation.

Under this condition, the electric flux distributes uniformly on the whole electrodes with uniform strength of electric field. As shown in FIG. 3, the electric flux concentrates into the current which flows in the resistor 5. If the impedance in the part yielding capacitance is sufficiently large compared with the resistance of resistor 5, the voltage generated in the resistor 5 is proportional to the total number of electric flux concentrating on the receiving electrode 3. FIG. 3 illustrates the way in which the electric flux diverges into two groups, which concentrate respectively into the resistor 5 and the electro-conductive material 1 to be measured. As the density of electric flux is dependent upon the strength of electric field, the density of group a of the flux flowing in the receiving electrode 3 is different from that of group b of the flux flowing in the electro-conductive material 1. This difference, however, causes no harm for the measurement since the measurement in this system concerns solely the group a of the flux. In fact, the current flowing through the resistor 5 is dependent upon the insertion extent x of the electro-conductive material 1. The relationship between them is linear for the first approximation, and expressed as $$I_L = k(1-x)$$

where $I_L$ is the current flowing through the resistor 5, and k is a proportional coefficient. The length of the two electrodes (distance in insertion direction for the electro-conductive material 1) is normalized to 1. Incidentally, the object of the present invention is to correct the measurement errors resulting from every disturbing factors affecting the density of the group a of the flux.

The case is concerned so far with only one frequency for the applied voltage, or the electric flux generated thereby.

The case for multiple frequency components in the electric flux is now considered. Specifically, when the frequency has two components $f_1$ and $f_2$, the numbers of the electric fluxes with these frequencies are assumed to be linearly distributed as follows:

$$EMf_{1x}=x \tag{3}$$

$$EMf_{2x}=1-x \tag{4}$$

where $EMf_{1x}$ and $EMf_{2x}$, represent the numbers of the electric fluxes at x with the frequencies $f_1$ and $f_2$, respectively. x denotes the insertion extent of the strip between the electrodes and the length of the two electrodes (distance in insertion direction for the electro-conductive material 1) is normalized to 1.

FIG. 4 shows the distribution of the number of the electric flux by the arrow length, where the full and broken lines indicate the numbers of the electric fluxes obtained from Equation (3) for frequency f, and Equation (4) for frequency $f_2$, respectively. As seen in FIG. 3, the current running through the resistor 5 is proportional to the integral of the electric flux reaching the receiving electrode without interruption by the electro-conductive material 1. With the range of x set to be 0<x<1, integration from x to 1 leads to the following expression for the current:

$$I_L f_{1x} = \int EMf_{1x} dx = \tfrac{1}{2} k(1-x^2) = \tfrac{1}{2} k(1-x)(1+x)$$

$$I_L f_{2x} = \int EMf_{2x} dx = \tfrac{1}{2} k(1-x)^2 = \tfrac{1}{2} k(1-x)(1-x)$$

where $I_L f_{1x}$ and $I_L f_{2x}$ indicate the currents flowing through the resistor 5 generated with the electric fluxes respectively corresponding to the frequencies $f_1$ and $f_2$. The ratio of $I_L f_{2x}$ to $I_L f_{1x}$ hence is obtained as $$\frac{I_L f_{2x}}{I_L f_{1x}} = \frac{1-x}{1+x} \tag{5}$$

the value of which varies continuously from 1 to the limiting value 0.

FIG. 5 displays the relationship of this ratio with the insertion extent x on a graph with the current ratio $I_L f_{2x}/I_L f_{1x}$ on the ordinate and the normalized insertion extent x on the abscissa. The relationship is obtained theoretically, so that some difficulty might arise around the limit with x=1. From the practical point of view, however, this can be overcome by restricting the maximum value of x, for example, less than 0.8. This current ratio can uniquely correspond to the value of x, leading to the measuring system to determine the insertion extent x of the electro-conductive material into the electrodes. It should be noted that the term k is eliminated by taking the ratio of the currents of two frequency components, implying that for the first approximation the various factors affecting k such as energization voltage, space dielectric constant, the distance between the transmitting and receiving electrodes, and the size of the electrodes influencing the total number of electric flux have no effects on measurement Moreover, applications implicated by the nonlinear relationship in FIG. 5 might become feasible by means of linearization such as nonlinear amplifiers or look-up tables.

Another operational treatment is further performed as follows. The sum $I_{LA}$ is obtained by addition of $I_L f_{1x}$ and $I_L f_{2x}$:

$$I_{LA}=\tfrac{1}{2} k(1-x)\{(1+x)+(1-x)\}=k(1-x)$$

The difference $I_{LD}$ between $I_L f_{1x}$ and $I_L f_{2x}$ also is derived as $$I_{LD}=I_L f_{1x}-I_L f_{2x}=\tfrac{1}{2} k(1-x)\{(1+x)-(1-x)\}=k(1-x)x$$

A variable gain amplifier now is introduced to the receiver system. The gain v for the amplifier is given by $$I_{LA}=vk(1-x)$$

whose value may always be held at any fixed value C by appropriate adjustment of v. With $k(1-x)$ C, hence, the current difference $I_{LD}$ can be written as $$I_{LD}=Cx$$

$$x = \frac{I_{LD}}{C} \tag{6}$$

The insertion extent x into the electrodes thus can be directly related proportionally to the output current difference $I_{LD}$. This relationship again is not dependent upon k. For this case as well, the maximum value of x is desired to be lower than some value allowable in the actual design, for example, less than 0.8 because, with the limit of x=1, v diverges in order to hold $I_{LA}$ at C.

As explained above, in the present invention the distribution of the number of the electric flux generated between the transmitting and receiving electrodes is formed so as to increase or decrease monotonously from the end of the electrode as indicated in FIG. 4. The current produced on the receiving electrode in response to insertion by x of the electro-conductive material from the end of the electrode is operationally treated to provide ever-stable measurement of x, independent of various kinds of environmental coefficients.

BRIEF DESCRIPTION OF THE DRAWINGS

FIG. 10 is a block diagram for processing the signal received by the receiving electrode through its conversion into the digital signal;

FIG. 11 is a block diagram for detection of the insertion extent x by sum and difference of the currents obtained with the receiving electrode according to the second embodiment of the present invention.

DETAILED DESCRIPTION OF THE PREFERRED EMBODIMENTS

Some preferred embodiments of the present invention will be described hereinbelow with reference to the accompanying drawings.

Figure 6:
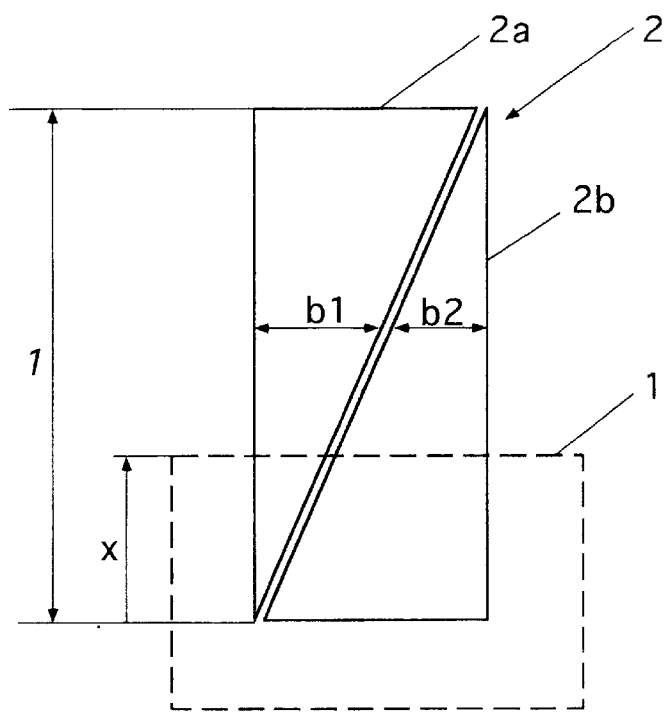
FIG. 6 exhibits the composition of the transmitting electrode for the first embodiment of the present invention.

FIG. 6 exhibits the composition of the transmitting electrode for the first embodiment of this invention. The transmitting electrode 2 is made of electro-conductive material, and composed of two identical triangular electrodes, the first electrode 2a and the second electrode 2b, which are disposed in opposite directions facing on the hypotenuse each other. At any position in the insertion direction, the sum B of the width $b_1$ of the first electrode 2a and the width $b_2$ of the second electrode 2b is constant The insertion extent of the electro-conductive material 1 is denoted by x, and the length of two electrodes 2a and 2b is set to 1 in the insertion direction.

Figure 7:
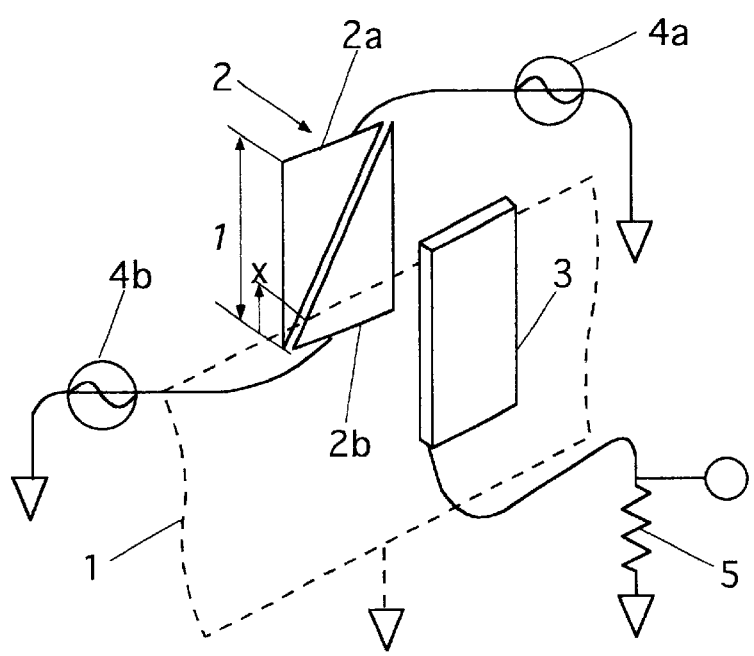
FIG. 7 illustrates the structure for the first embodiment of the present invention.

FIG. 7 illustrates the structure for the first embodiment of the invention. The transmitting electrode 2 and the receiving electrode 3 are disposed facing each other and parallel to the insertion direction of the electro-conductive material 1. The transmitting electrode 2 is comprised of the first electrode 2a and the second electrode 2b which are disposed in parallel each other. The receiving electrode 3 is made of electro-conductive material, on which the voltage potential at any point is virtually constant so that the current due to the electric flux concentrating in the receiving electrode 3 is proportional to the integral of the flux. The receiving electrode 3 is connected to the resistor 5, from which the output voltage is derived. It should be noted that the composition of the receiving electrode 3 is same for the following embodiments. The first source 4a to generate the alternating signal $S_1$ with frequency $f_1$ is connected to the first electrode 2a, and similarly the second source 4b to generate the alternating signal $S_2$ with frequency $f_2$ is connected to the second electrode 2b. Both of the voltages $E_1$ and $E_2$ for the respective alternating signals $S_1$ and $S_2$ are set equal to $E_r$.

The voltage potential of the first electrode 2a is equal to that of the second electrode 2b, and the distance between the receiving electrode 3 and both of the electrodes 2a and 2b is constant. The density of electric flux thus is uniform at any point on the both electrodes 2a and 2b and the receiving electrode 3. On the other hand, the number of the electric flux is proportional to the area of the electrodes 2a and 2b, so that the number of the electric flux on the first electrode 2a increases linearly from the end of inserting the electro-conductive material 1 to the opposite end, while the number of the electric flux on the second electrode 2b decreases linearly in the inverse way. According to this arrangement, the distributions of the number of the electric flux by the signals with frequencies $f_1$ and $f_2$ vary linearly as same as the distributions shown in FIG. 4. The current generated on the receiving electrode 3 is proportional to the total number of the electric flux concentrated on the receiving electrode 3. Consequently, in this embodiment, Equation (5) holds for determination of the insertion extent x of the electro-conductive material 1 between the electrodes 2 and 3 from the current generated on the receiving electrode 3.

Furthermore, modification of geometric shape of the first electrode 2a and/or the second electrode 2b into nonlinear form makes nonlinear distribution in the number of the electric flux possible. It is convenient that the nonlinearity compensation mentioned above for signal processing thereafter may be omitted by forming the area distributions on the electrodes 2a and 2b so as to compensate the output characteristics (the current ratio derived from Equation (5)).

Figure 5:
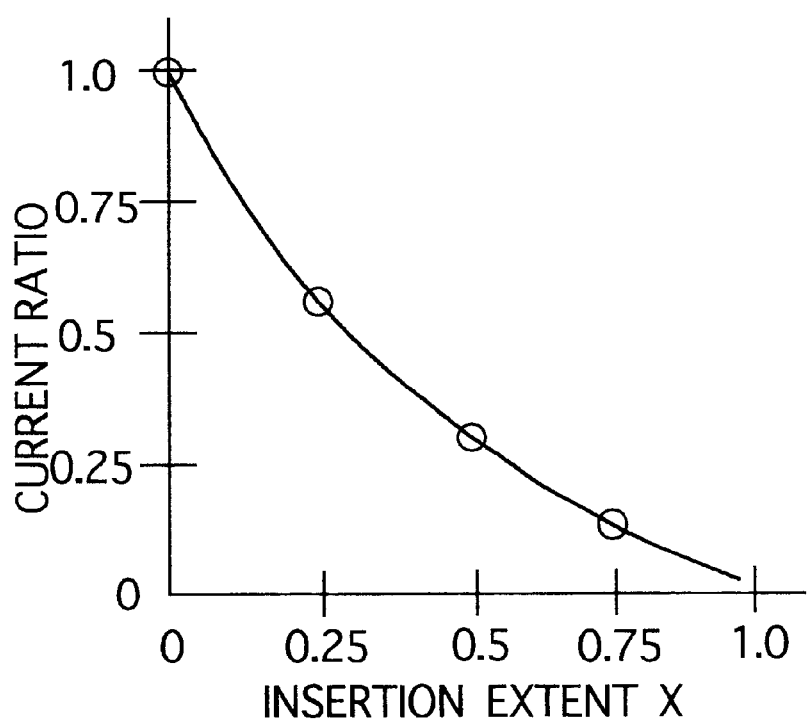
FIG. 5 shows the theoretical curve representing the relationship between the edge position of electro-conductive material and the output signal for the present invention.
Figure 8:
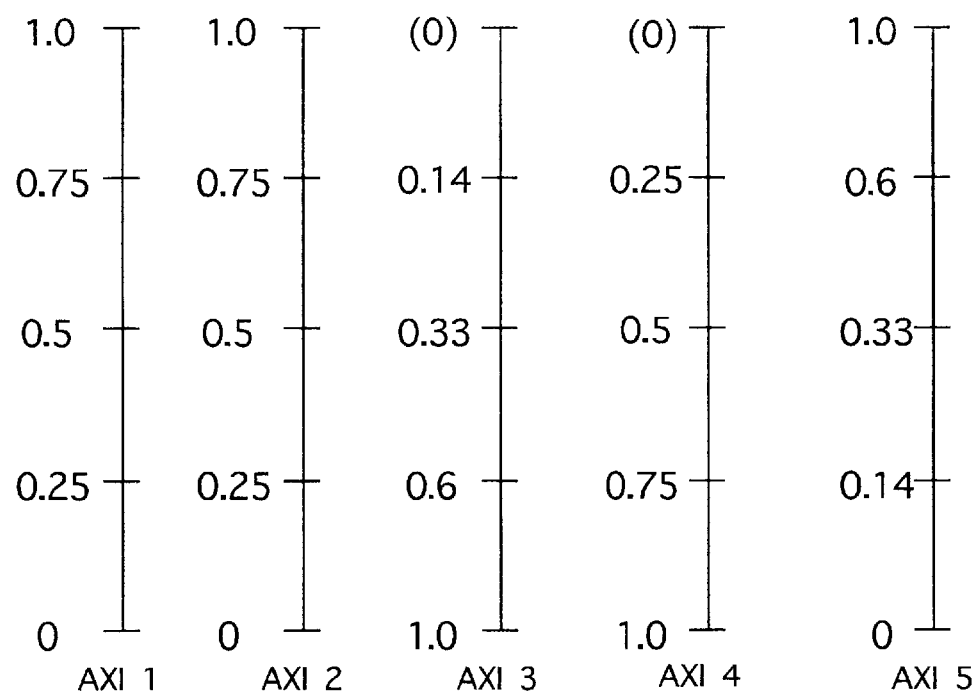
FIG. 8 explains the requirement for the transmitting electrode to compensate the nonlinearity in the output (the current ratio)

In FIG. 8 the procedure for linearization of the output characteristics is explained to give a general idea. The scale on the axis 1 indicates the normalized position of the insertion extent x of the electro-conductive material 1 into the electrodes. The scales on the other axes are designated in reference to this position. On the axis 2 the normalized distribution of the width of the transmitting electrode 2 is indicated. Owing to its linearity the scale is same as that on the axis 1. On the axis 3 the normalized output without correction (the current ratio derived from Equation (5)) is shown. Obviously, the relationship between the axis 1 and the axis 3 represents the same characteristics as in FIG. 5. The normalized output p has the same relationship with the insertion extent x of the electro-conductive material 1 into the electrodes as Equation (5):

$$p = \frac{1-x}{1+x}$$

from which the position x for an arbitrary p is expressed by the equation, $$x = \frac{1-p}{1+p}$$

It hence follows that the linear output characteristics as on the axis 4 can be finally obtained with the area distribution on the axis 5 in place of the linear distribution on the axis 2. For the actual design of this embodiment, employment of nonlinear area distribution for the transmitting electrode may be chosen by economical comparison with implementation of nonlinear compensators.

Figure 9:
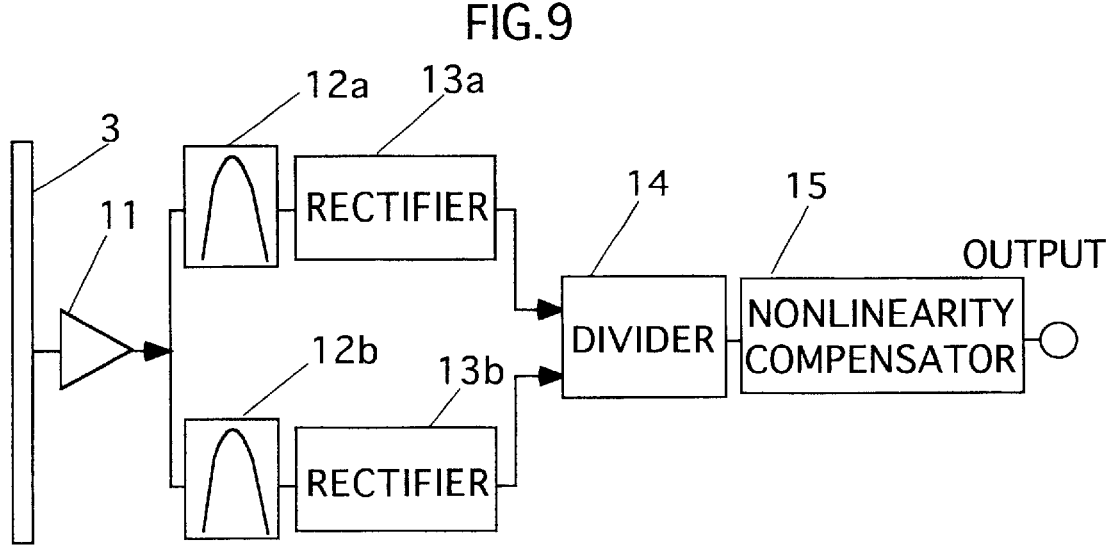
FIG. 9 is a block diagram for processing the signal received by the receiving electrode.

FIG. 9 shows the composition for processing of the current obtained at the receiving electrode 3. The current concentrated on the receiving electrode 3 is converted to practical voltage with the amplifier 11. Subsequently, the voltage is fed to the band-pass filter 12a tuned with frequency $f_1$ and the band-pass filter 12b tuned with frequency $f_2$ to be separated into the $f_1$ and $f_2$ components. These components are converted to the direct-current signals by the rectifiers 13a and 13b, respectively, which are fed to the analog divider 14 to determine the insertion extent x of the electro-conductive material 1 into the electrodes 2 and 3 according to the method of Equation (5). The final output then is obtained by the linear correction of the nonlinearity in FIG. 5 through the nonlinear compensator 15 if the treatment should be necessary.

FIG. 10 illustrates a device for processing the current received by the receiving electrode 3 with use of digital elements. The composition is the same as in FIG. 9 up to the rectifiers 13a and 13b, followed with the A/D converters 16a and 16b for conversion to the digital data, which are led to the digital divider 17 to determine the insertion extent x of the electro-conductive material 1 into the electrodes 2 and 3. The output then is corrected by linearization with the look-up table 18, if necessary, to provide the final output.

The second embodiment of the invention now is explained. In contrast to the first embodiment in which the devices as shown in FIGS. 9 and 10 operate according to Equation (5) to obtain the current ratio for determination of the insertion extent x of the electro-conductive material 1 into the electrodes, the insertion extent x is evaluated from Equation (6) using the sum and difference of the currents in the second embodiment FIG. 11 displays the structure for the second embodiment The current generated on the receiving electrode 3 is amplified with the variable gain amplifier 21, and then the components for frequencies $f_1$ and $f_2$ are separated with the band-pass filters 22a and 22b, respectively. After the components are rectified with the respective rectifiers 23a and 23b, subtraction and addition are performed on them with the subtracter 24 and the adder 25, respectively. A control-signal generator 26 determines a gain of the variable gain amplifier 21 so as for the output of the adder 25 to coincide with a constant value C fixed with the constant-setting unit 27. The output of the subtracter 24 is the final output for the insertion extent x of the electro-conductive material 1 into the electrodes.

The output of the adder 25 is compared with the fixed value C, and the gain of the variable gain amplifier 21 is regulated by the signal based on the difference between them, so that the output of the adder 25 is always held at a constant value. Under this circumstance the output of the subtracter 24 is directly proportional to the insertion extent x of the electro-conductive material 1 into the electrodes, as Equation (6) indicates. The output of the control-signal generator 26 is generated based on the difference between the output of the adder 25 and the fixed value C. Nevertheless, the method is arbitrary, and then, for example, P mode, PI mode or PID mode may be adopted. Further, the feedback control is employed for this embodiment, while other control methods are possible. In fact, as long as the sum of the detection signals for frequencies $f_1$ and $f_2$ is computable, the feedforward control also is feasible so that later evaluation of the difference from the sum leads to determination of the insertion extent x of the electro-conductive material 1 into the electrodes.

Figure 12:
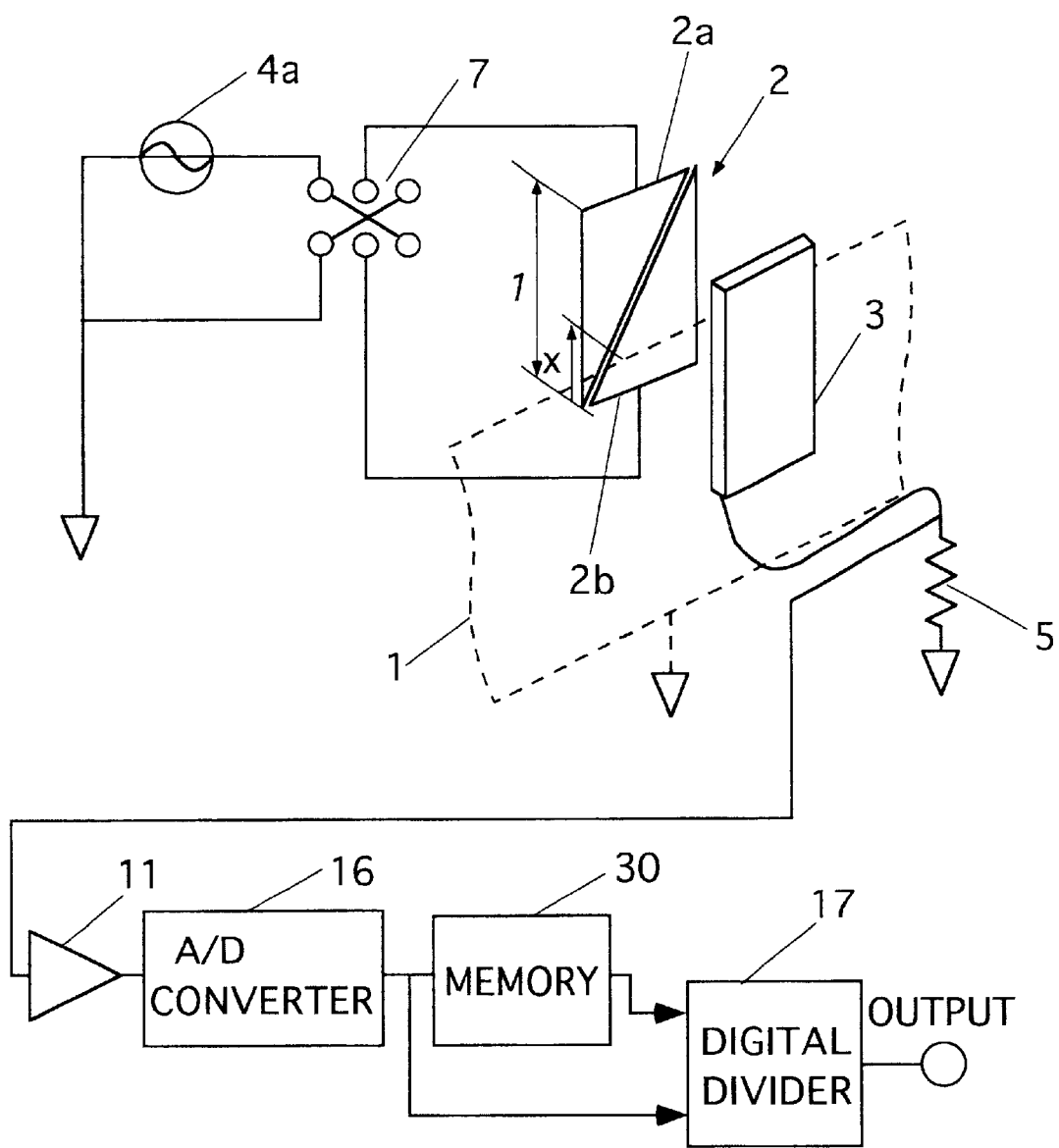
FIG. 12 displays the structure for the third embodiment of the present invention.

The third embodiment of the invention now is explained in reference to FIG. 12. In contrast to the first embodiment in which the exciting signal source uses the two frequencies $f_1$ and $f_2$ simultaneously, that is, during a single time interval, the third embodiment exploits a time-sharing method such that a single frequency is employed in a pair of time intervals.

In FIG. 12 the signal source 4a to generate the signal $S_1$ with frequency $f_1$ is connected to the transfer switch 7, which is connected to the transmitting electrode 2. One of the input terminals of the switch 7 is connected to the signal source 4a and the other is grounded, while one of the output terminals is connected to the first electrode 2a and the other to the second electrode 2b. By means of this switching the connection of the first electrode 2a to the signal source 4a and the second electrode 2b to the ground, and its reverse connection as well are attained. The receiving electrode 3 is successively connected with the amplifier 11, the A/D converter 16, the memory 30 and the digital divider 17.

Figure 1:
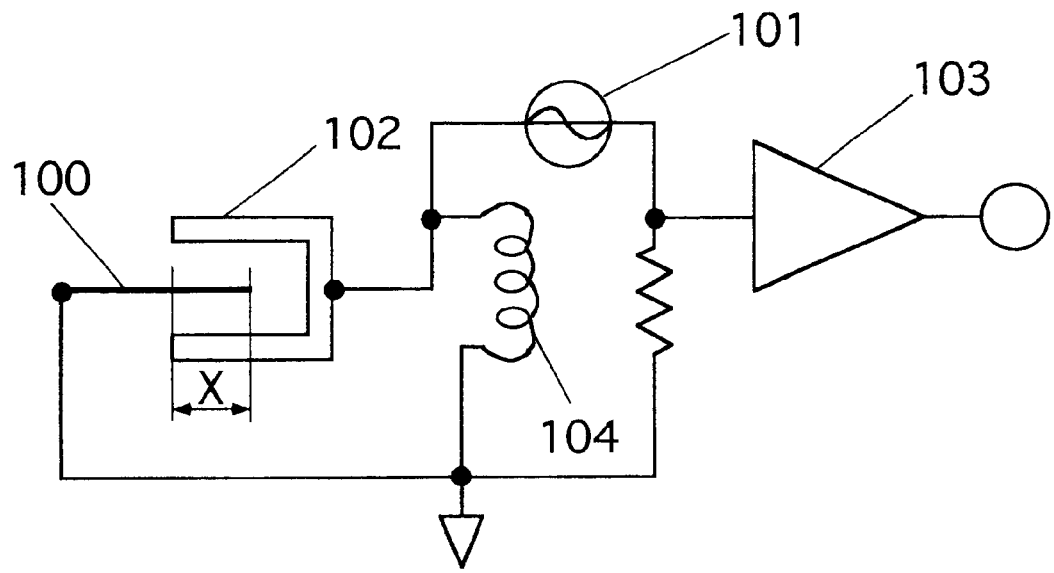
FIG. 1 is a basic circuitry in the device for measurement of an inserted portion of an electro-conductive material through the change in capacitance.
Figure 2:
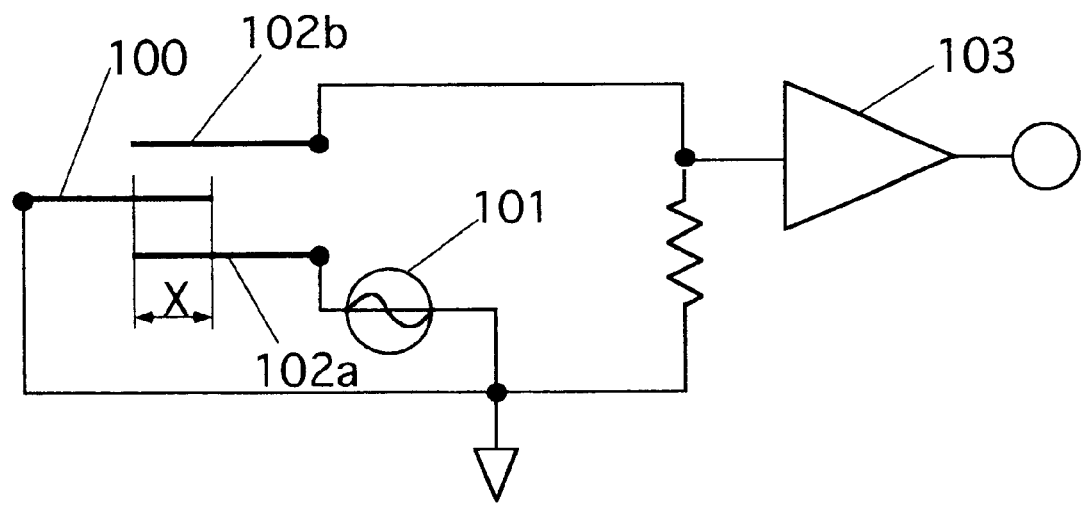
FIG. 2 is a basic circuitry in the device for measurement of an inserted portion of an electro-conductive material through the change in electric flux.
Figure 3:
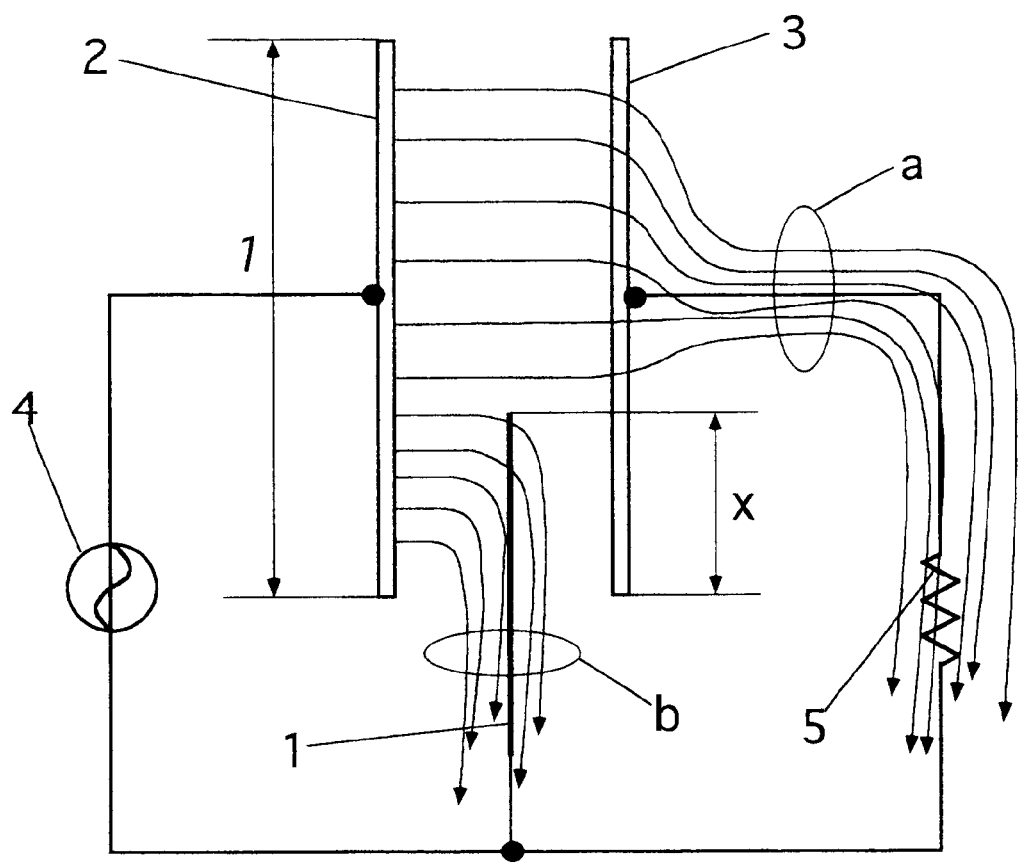
FIG. 3 illustrates the basic operation in a sensor of electrostatic three-terminal model.
Figure 4:
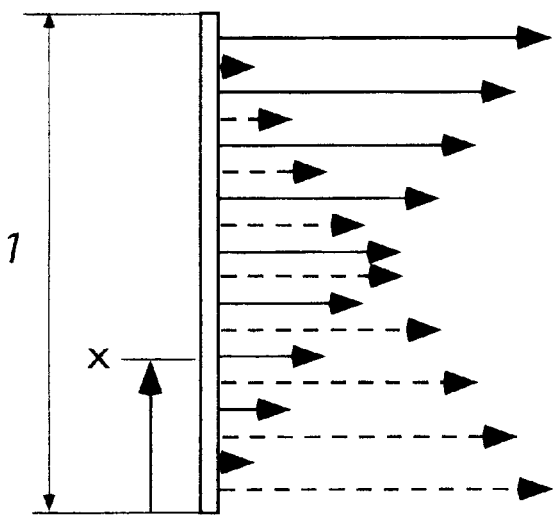
FIG. 4 displays the distribution in the number of the electric flux fundamentally characteristic to the present invention.

With this arrangement the signal source 4a generates the distribution of the number of the electric flux between the transmitting electrode 2 and the receiving electrode 3 as shown with the full lines (or broken lines) in FIG. 4. The data collected with this operation are converted to the digital data to be saved in the memory 30 temporally. Then, after the switch operation with the transfer switch 7, the distribution of the number of the electric flux becomes the one as shown with the broken lines (or full lines) in FIG. 4. The data from this operation are converted to the digital data for processing together with the data stored in the memory 30 by the digital divider 17 to determine the insertion extent x of the electro-conductive material 1 into the electrodes 2 and 3. This embodiment requires only one set of signal source, band-pass filter and A/D converter, providing an economically better system. The method also suits signal processing with computers which is common at present.

As clearly explained hereinabove, the present invention enables construction of the apparatus which can eliminate the instability intrinsic to edge sensor device of electrostatic three-terminal model for electro-conductive material, that is, the fluctuations in measurement due to the typical environmental factors like exciter signal voltage, distance between the electrodes, or atmospheric dielectric constant. Although the composition utilizing two frequencies for signal transmitters is explained as examples in the embodiments, more than two frequencies may be used in practice.

What is claimed is:

1. An edge sensor device comprising:
   a) a pair of transmitting electrodes made of electro-conductive material, each electrode having almost identical shape of triangular plate where the electrodes are disposed parallel to the moving direction of the edge portion of an electro-conductive strip and in the opposite directions each other;
   b) a receiving electrode disposed facing said transmitting electrodes and with said electro-conductive strip inserted between the transmitting electrodes and said receiving electrode;
   c) a signal source applying respectively an alternating signal $S_1$ with frequency $f_1$ to one of said transmitting electrodes and an alternating signal $S_2$ with frequency $f_2$ to the other of said transmitting electrodes; and
   d) a sensor means for evaluation of the insertion extent of said electro-conductive strip between said transmitting electrodes and said receiving electrode from a current $I_1$ with frequency $f_1$ and a current $I_2$ with frequency $f_2$ generated on said receiving electrode.

2. The edge sensor device according to claim 1, equipped with said sensor means utilizing a ratio between said currents $I_1$ and $I_2$ to evaluate the insertion extent of said electro-conductive strip.

3. The edge sensor device according to claim 1, equipped with said sensor means for evaluation of the insertion extent of said electro-conductive strip utilizing the difference between currents $I_{1V}$ and $I_{2V}$ obtained with amplification of said currents $I_1$ and $I_2$ by an equal gain determined so as for the sum of said currents $I_1$ and $I_2$ to be held constant.

4. The edge sensor device according to claim 1, wherein said signal source transmits during exclusively allocated time intervals said alternating signals $S_1$ and $S_2$ with said frequencies $f_1$ and $f_2$ which are equal or different and wherein said sensor means for evaluation of the insertion extent of said electro-conductive strip utilizes operational treatment of the data in such a digital form from both currents $I_1$ and $I_2$ by storing the data from the current $I_1$ corresponding to the signal first transmitted until the data from the current $I_2$ corresponding to the signal subsequently transmitted are obtained.

* * * * *